May 24, 1927.                                                      1,629,660
                     L. GAISMAN ET AL
   APPARATUS FOR FORMING DOVETAIL OR UNDERCUT RECESSES IN
              CLAY OR OTHER PLASTIC MATERIAL
                    Filed Feb. 5, 1926              3 Sheets-Sheet 1

Inventors:
Lucien Gaisman
Arthur E. Brown
By their Attorney: Walter Gunn

May 24, 1927.　　　　　　　　　　　　　　　　1,629,660
L. GAISMAN ET AL
APPARATUS FOR FORMING DOVETAIL OR UNDERCUT RECESSES IN
CLAY OR OTHER PLASTIC MATERIAL
Filed Feb. 5, 1926　　　　3 Sheets-Sheet 3

Inventors:
Lucien Gaisman
Arthur E. Brown
By their Attorney: Walter Gunn

Patented May 24, 1927.

1,629,660

UNITED STATES PATENT OFFICE.

LUCIEN GAISMAN, OF AUDENSHAW, NEAR MANCHESTER, AND ARTHUR EDWARD BROWN, OF BRENTWOOD, ENGLAND, ASSIGNORS TO UNIVERSAL RUBBER PAVIORS (MANCHESTER 1923) LIMITED, OF AUDENSHAW, NEAR MANCHESTER, ENGLAND, A BRITISH COMPANY.

APPARATUS FOR FORMING DOVETAIL OR UNDERCUT RECESSES IN CLAY OR OTHER PLASTIC MATERIAL.

Application filed February 5, 1926, Serial No. 86,311, and in Great Britain February 9, 1925.

This invention refers to new or improved apparatus for forming dovetail or undercut recesses in clay or other plastic material. One of the uses of the invention will be in connection with the formation of the dovetail recesses in blocks of clay, shale, concrete or the like, prior to hardening, and a particular use of the invention will be in connection with the paving blocks forming the subject of Patent No. 1,560,174 and of application for Patent No. 655,363 filed 2nd August, 1923. Said blocks are made of clay, shale or like material capable of withstanding vulcanizing temperatures, and prior to hardening require to be formed with dovetail recesses along the sides, at each corner, and sometimes at points other than the sides and corners. The formation of these recesses by reamering is not satisfactory and leads to irregular results.

The object of the present invention is the provision of means whereby the recesses can be easily and rapidly formed and with regular results.

According to the invention, each recess is formed by an expanding mandril designed first to produce the recess by direct lineal pressure and then by lateral pressure, or by simultaneous lineal and lateral pressure, the mandril being such as to allow of its ready withdrawal from the recesses after formation. In the case of a block of plastic material requiring to have a series of recesses formed in it at one operation, a series of mandrils will be used, and operated simultaneously. Each mandril comprises a steel or like rod formed at its working end with a conical enlargement. Over the rod slidably fits an india-rubber or like elastic sleeve, which at the end nearest the conical enlargement of the rod is formed with a conical bore of slightly steeper taper than the conical enlargement of the rod. Said elastic sleeve is preferably the same external diameter as the larger end of the rod enlargement, although it may be rather more or less. In all cases, the internal diameter of the rubber sleeve is less than the larger diameter of the rod enlargement. The rubber sleeve is slitted longitudinally, the slits not extending completely through the wall of the sleeve, nor to each end. The purpose of the slits is to make the sleeve more flexible or supple, and to permit it to readily spread outwards on meeting the conical enlargement of the rod, the normal position of the sleeve being with its outer circumference parallel with the axis of the rod.

Upon the accompanying drawings:—

Figure 1:
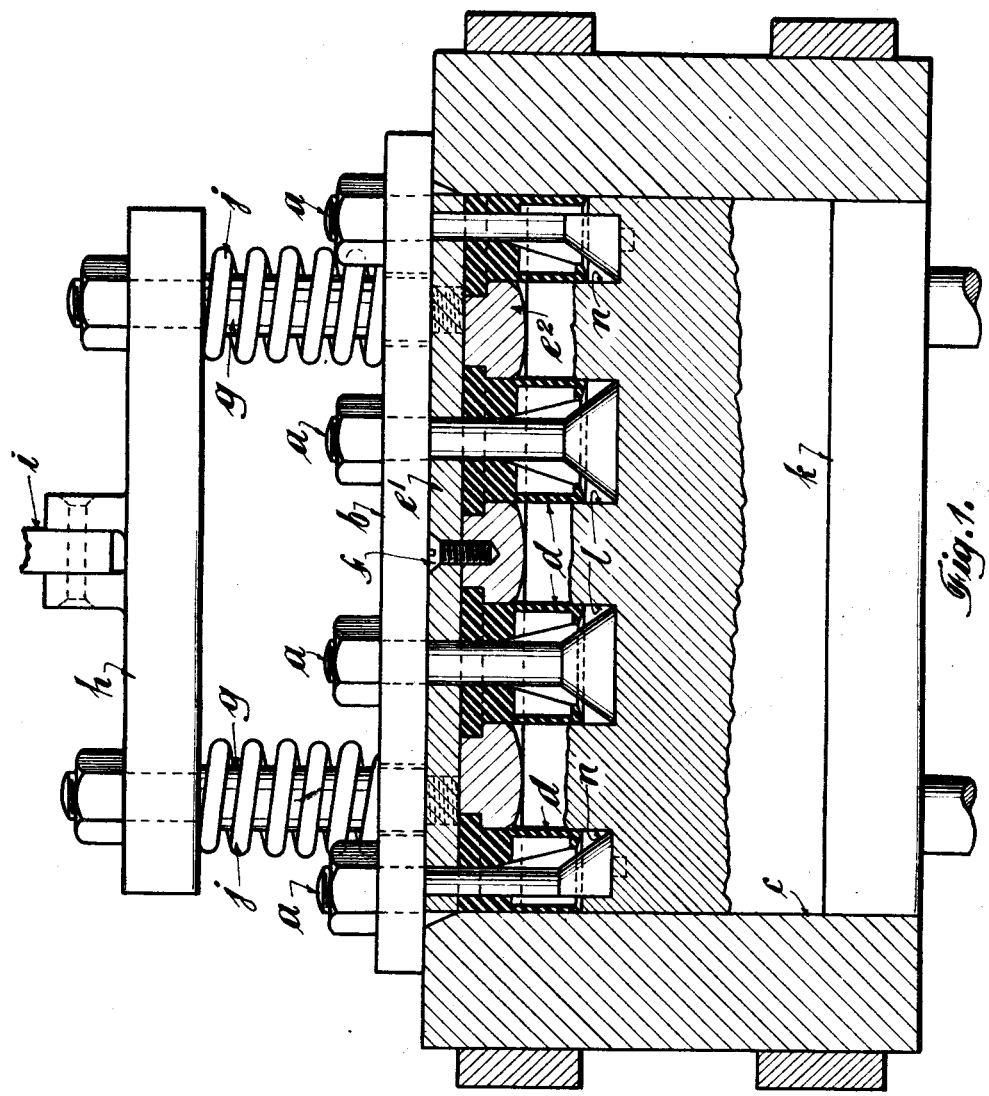
Fig. 1 illustrates a sectional elevation of one example of the improved apparatus.

Referring to Fig. 1, $a$, $a$ are the steel or like rods with enlarged lower ends completely conical or partly conical and partly flat-sided. Said rods are carried by a metal plate $b$ adapted to overlie the top of the moulding box $c$. $d$, $d$ are the rubber sleeves, each formed with a hard or solid flange at its top end, which is clamped between two further metal plates $e^1$, $e^2$ held together by suitable spaced screws $f$. Said plates are the same shape in plan as the moulding box, and are adapted to slide up and down therein. To the plate $e^1$ are secured rods $g$ which slidably pass through holes in the plate $b$ and are bolted to a cross-bar $h$. To said cross-bar is connected the link $i$ by which suitable hand or power operated mechanism the bar $h$, plates $b$, $e^1$, $e^2$, rods $a$, $a$ and sleeves $d$, $d$ may be moved bodily to be raised and lowered. In Fig. 1 the plates and rods are shown lowered, the plate $b$ resting on the top edge of the moulding box, and the conical or part conical ends of the rods, lowered into the clay or other plastic body within the moulding box.

Figure 8:
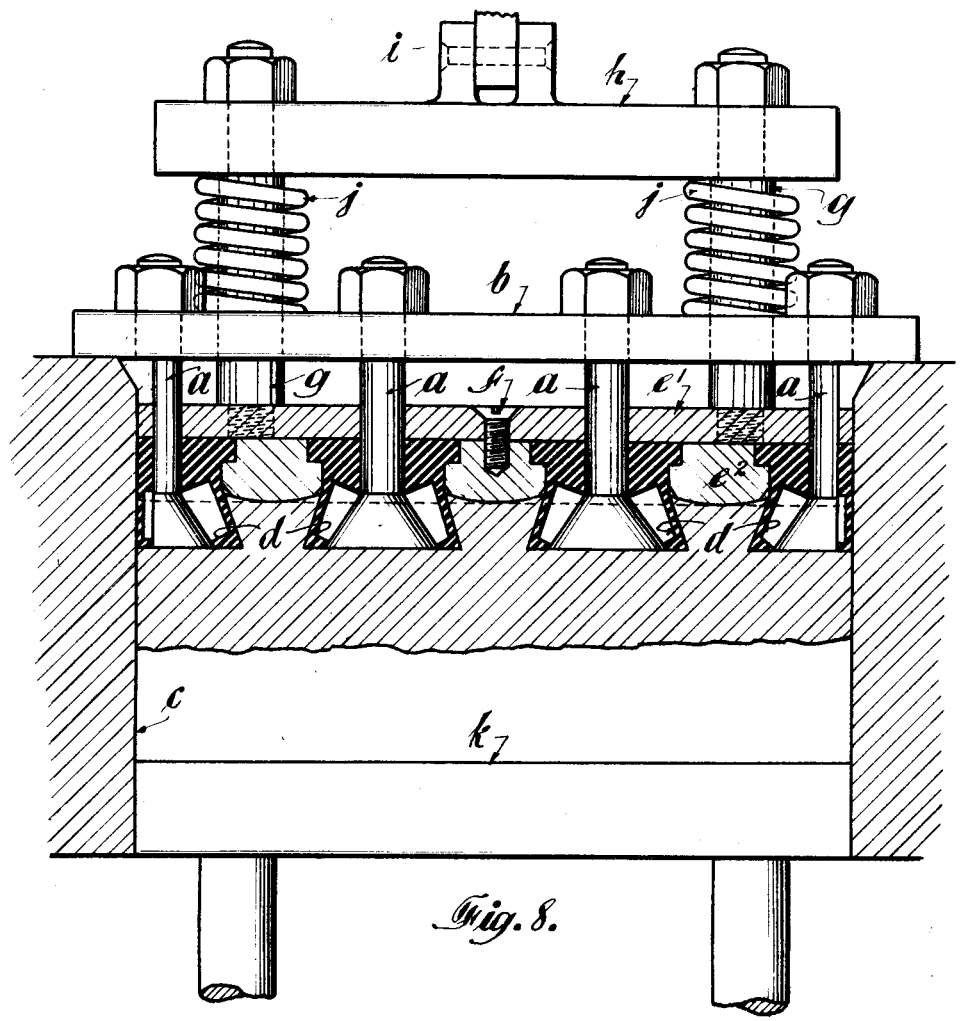
Fig. 8 is a repeat view of Fig. 1, but with the rubber sleeves lowered into the plastic material.
Figure 9:
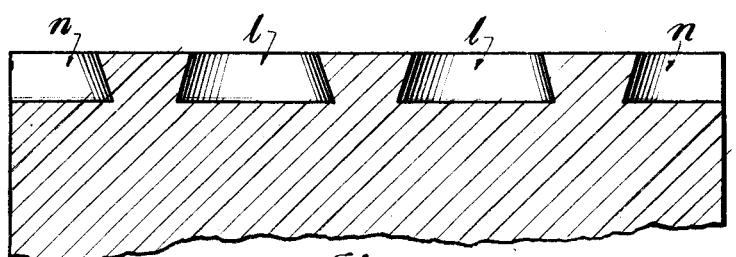
Fig. 9 illustrates a cross section of the plastic block after raising the mandrils out of the recesses.

Encircling the rods $g$ are springs $j$ which normally hold the plates $e^1$, $e^2$ against the plate $b$ and the rubber sleeves $d$, $d$ raised. In such position the lower end of each rubber sleeve lies just within the straight sided recess formed by the rod $a$, see Fig. 1. Upon the bar $h$ being then forced further down against the resistance of the springs $j$ the rubber sleeves $d$, $d$ at their lower ends and inner edges, contact with the conical enlargements of the rods, whereupon owing to the flexibility of the slitted parts of the sleeves, these latter spread or stretch outwards and by the time the lower ends of the sleeves reach the bottoms of the recesses, the sleeves impart to the sides of the recesses the desired undercut formation, see Figs. 8 and 9. To ensure of the bottom of the recess being level, the lower end of the rubber sleeve may be slightly countersunk.

On removing the pressure from the crossbar $h$ the springs $j$ and plates $e^1$, $e^2$ withdraw the rubber sleeves from the recesses in the plastic block, the expanded parts of the sleeves as they slide upwards over the conical enlargements of the rods, contracting and leaving the recesses without deforming same. On raising the cross-bar, plates and mandrils, clear of the moulding box, the treated block may be ejected by means of the loose sliding floor $k$.

Instead of the rods and rubber sleeves being moved or operated successively, the sleeves may be operated simultaneously with the rods, the sleeves exercising the lateral thrust while the rods exercise the downwards or longitudinal thrust.

The shapes of the enlarged ends of the rods $a$, $a$ and of the sleeves $d$, $d$ will vary with the required shapes in plan of the recesses. They may also vary in taper and in surface contour.

Figure 2:
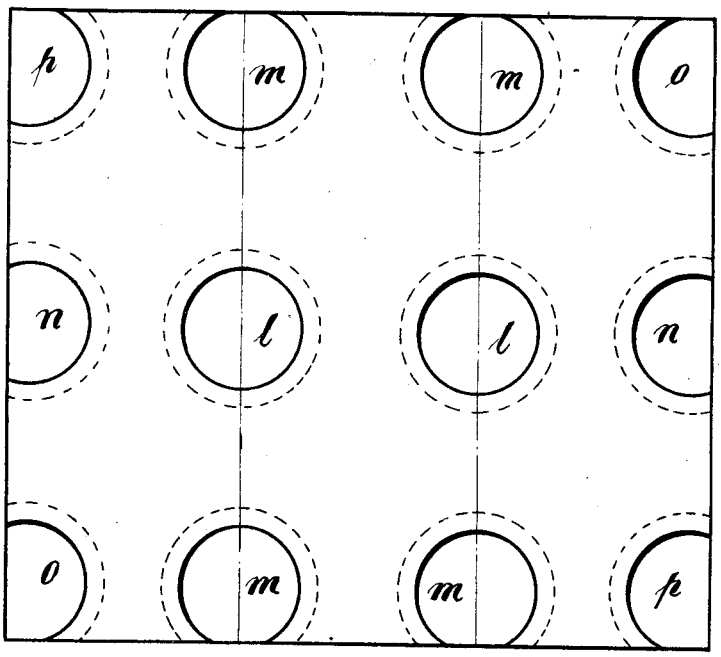
Fig. 2 illustrates a plan of a block of plastic material and shows dovetail recesses formed in such block by the apparatus shown in Fig. 1.
Figure 3:
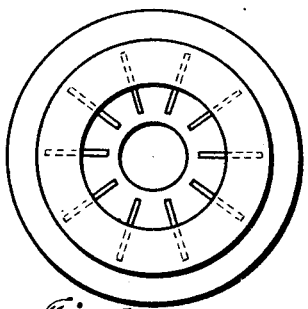
Figs. 3 to 7 illustrate inverted plan views of the rubber sleeves used in forming the recesses shown in Fig. 2.
Figure 4:
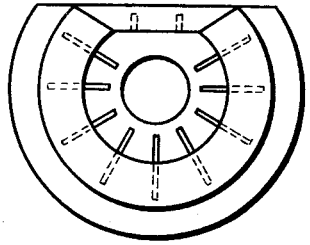
Figure 5:
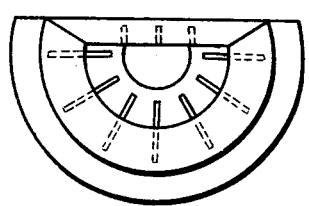
Figure 6:
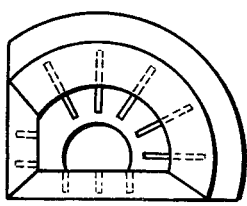
Figure 7:
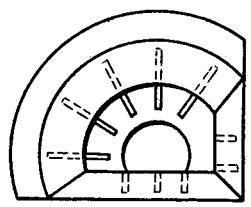

In the case of the block shown in Fig. 2, the circular recesses $l$, $l$ are made by means of the circular shape of sleeve shown in Fig. 3. The recesses $m$, $m$ are made by means of the shape of sleeve shown in Fig. 4. The recesses $n$, $n$ are made by means of the shape of sleeve shown in Fig. 5. The recesses $o$, $o$ are made by the shape of mandril (rod and sleeve) shown in Fig. 6. The recesses $p$, $p$ are made by the shapes of sleeves shown in Figs. 6 and 7.

The conical enlarged ends of the rods $a$ on their otherwise flat underfaces may have one or more small protuberances (or sinkings) for producing sinkings (or protuberances) in (or on) the bottom faces of the recesses, these being usually on the rods used for producing edge or corner recesses. The sinkings or protuberances in the block are the subject of a co-pending application and form no part of this invention.

As shown, the slits in each rubber-sleeve extend almost through the wall of the sleeve, and from a point level with the underside of the plate $e^2$ to a point near the lower end.

Obviously, the improved apparatus may comprise a single mandril (rod and sleeve) where single recesses are required.

What we claim is:—

1. In means for forming dovetail or undercut recesses in plastic materials, a rod with enlargement at one end, such enlargement being part of a cone, and a rubber sleeve slidably mounted on said rod, the bore of the sleeve at the part nearest the rod enlargement being of like shape to the enlargement and the wall of the sleeve at such part being flexible, and adapted to spread out on engaging the rod enlargement, the outer diameter of the sleeve being similar to that of the larger part of the rod enlargement, means whereby the rod is held supported, further means whereby the sleeve is held supported and clear of the rod enlargement, and means whereby the said sleeve-supporting means may be yieldingly moved to force the sleeve against the rod enlargement and cause it to spread outwards and on the pressure being removed cause the sleeve to move clear of the rod enlargement and to contract, the said rod supporting means, and sleeve-supporting means being movable, as one, as well as one being movable relatively to the other, as set forth.

2. In means for forming dovetail or undercut recesses in plastic materials, a rod with an enlargement at one end, such enlargement being part of a cone and a rubber sleeve slidably mounted on said rod, the bore of the sleeve at the part nearest the rod enlargement being of like shape to the enlargement, and the wall of the sleeve at such part being slitted radially but the slits not extending completely through the wall of the sleeve, and the sleeve being thereby rendered flexible and adapted to spread out on engaging the rod enlargement, the outer diameter of the sleeve being similar to that of the larger part of the rod enlargement, means whereby the rod is held supported, further means whereby the sleeve is held supported and clear of the rod enlargement, and means whereby the said sleeve-supporting means may be yieldingly moved to force the sleeve against the rod enlargement and cause it to spread outwards and on the pressure being removed cause the sleeve to move clear of the rod enlargement and to contract, the said rod-supporting means and sleeve-supporting means being movable, as one, as well as one being movable relatively to the other, as set forth.

3. In means for forming dovetail or undercut recesses in plastic materials, a rubber sleeve of a shape at one end such as to allow of being held clamped by clamping plates, and on its interior being parallel-sided for a portion of its length and of like shape to part of a cone for the remaining portion of its length, the wall of the sleeve at this last-named part having slits which extend radially but not completely through the wall of the sleeve, as set forth.

4. In means for forming dovetail or undercut recesses in plastic materials, a moulding box, a removably fitted plate closing said box, at least one rod slidably passing through said plate and extending into the box and into any plastic material within the box, that end of the rod extending into the plastic material having an enlargement forming part of a cone, a rubber sleeve slidably mounted on said rod and of an external diameter similar to that of the larger part of the rod enlargement, and said sleeve on its inner bore and at the part furthest from the rod enlargement, being parallel sided, and closely fitting the rod, and said bore at the part next the enlargement being of like shape to the enlargement, the wall of the sleeve at such last-named part being comparatively thin and flexible, further plates to which the sleeve is secured and by which it may be moved to and fro along the rod, means for positioning the rod relatively to the moulding box platem springs and guide rods and a cross-bar connecting said guide rods, for yieldingly supporting the rubber-sleeve supporting plates with the rubber sleeve clear of the rod enlargement, the guide rods slidably extending through the moulding box plate, and the springs lying between such plate and the cross-bar, by which latter the springs may be compressed and the sleeve moved along the rod and caused to engage the rod enlargement and spread outwards, the sleeve contracting and resuming its original formation and position on the pressure being removed, as set forth.

5. In combination, a moulding box open top and bottom, a sliding bottom in said box for ejecting any plastic material therefrom after being provided with recesses in its top face, a plate resting upon and closing the top end of the moulding box, a plurality of rods slidably passing through said plate, and extending into the box and into any plastic material within the box, that end of each rod extending into the plastic material having an enlargement forming part of a cone, a rubber sleeve slidably mounted on each rod and of an external diameter similar to that of the larger part of the rod enlargement, and each sleeve on its inner bore and at the part furthest from the rod enlargement, being parallel sided and closely fitting the rod, and said bore at the part next the enlargement being of like shape to the enlargement, the wall of the sleeve at such last-named part being comparatively thin and flexible, further plates to which the sleeves are secured and by which they may be moved to and fro along the rods, means for positioning the rods relatively to the moulding box plate, springs and guide rods and a cross-bar connecting said guide rods, for yielding supporting the rubber-sleeve supporting plates with the rubber sleeves clear of the rod enlargements, the guide rods slidably extending through the moulding box plate, and the springs lying between such plate and the cross-bar by which latter the springs may be compressed and the sleeves moved along their rods and caused to engage the rod enlargements and spread outwards, the sleeves contracting and resuming their original formations and positions on the pressure being removed, as set forth.

In testimony whereof we have signed our names to this specification.

LUCIEN GAISMAN.
ARTHUR E. BROWN.